Figure 1:
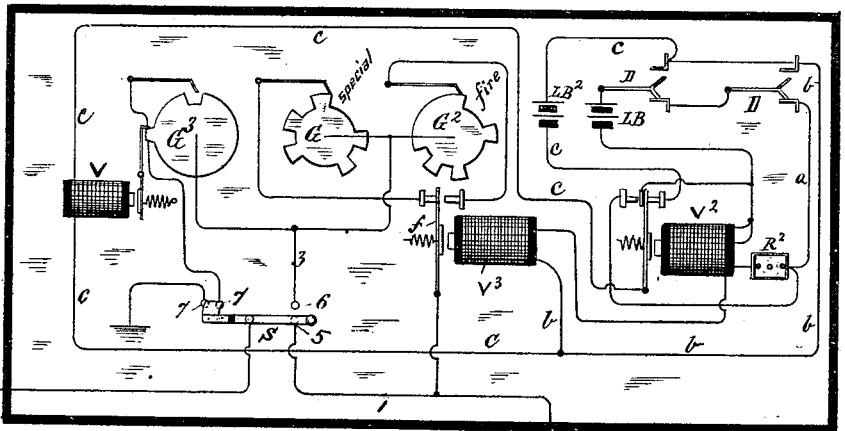

(No Model.) 3 Sheets—Sheet 1.

J. H. GUEST.
FIRE TELEGRAPH.

No. 388,357. Patented Aug. 21, 1888.

WITNESSES
Gabriel J. W. Galster
Wm H. Capel

INVENTOR.
J. H. Guest
BY
Townsend & MacArthur.
ATTORNEYS.

N. PETERS, Photo-Lithographer, Washington, D. C.

(No Model.) 3 Sheets—Sheet 2.
J. H. GUEST.
FIRE TELEGRAPH.
No. 388,357. Patented Aug. 21, 1888.
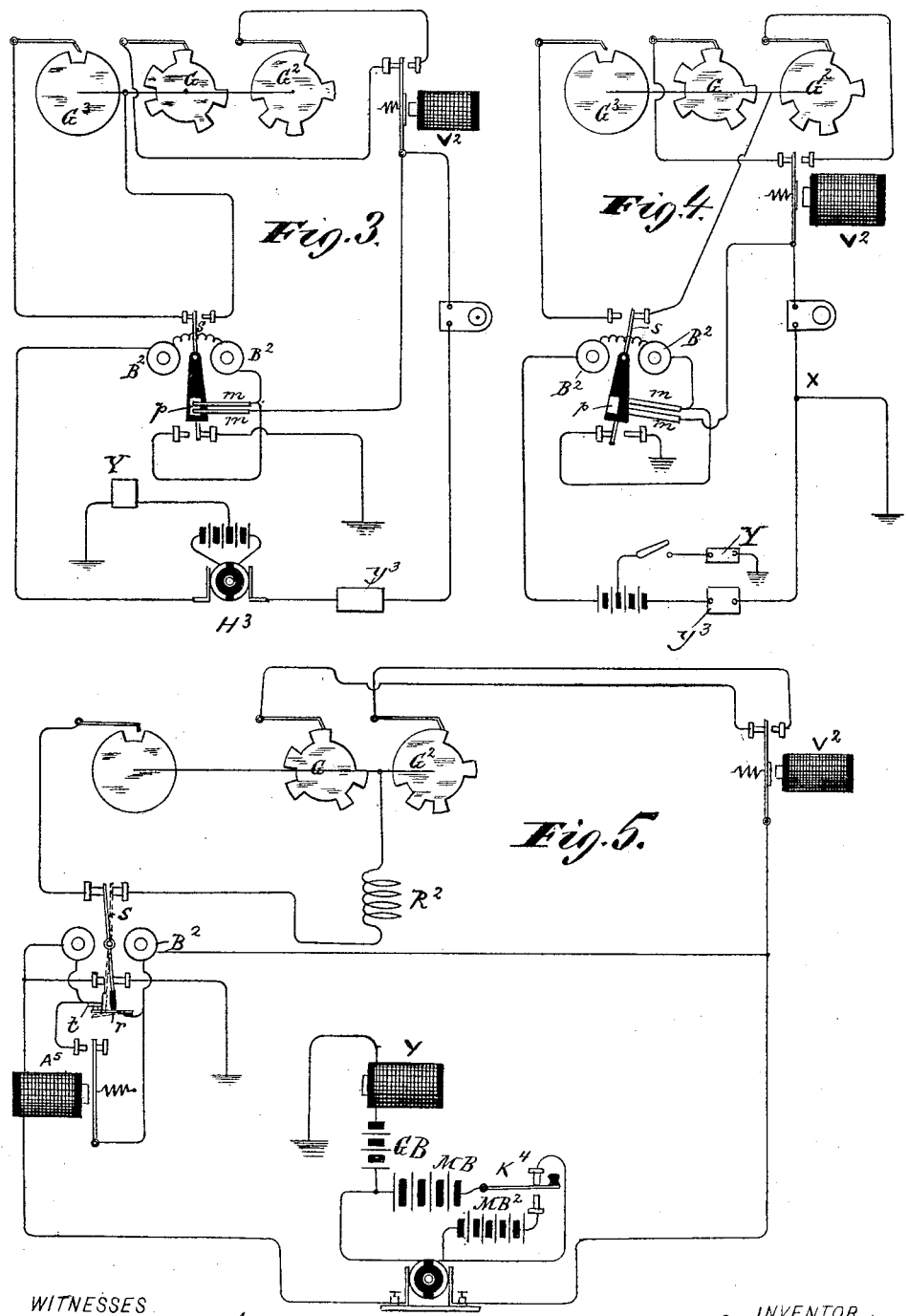
WITNESSES
INVENTOR
BY
ATTORNEYS.

(No Model.)  3 Sheets—Sheet 3.
J. H. GUEST.
FIRE TELEGRAPH.
No. 388,357.  Patented Aug. 21, 1888.
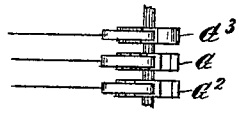
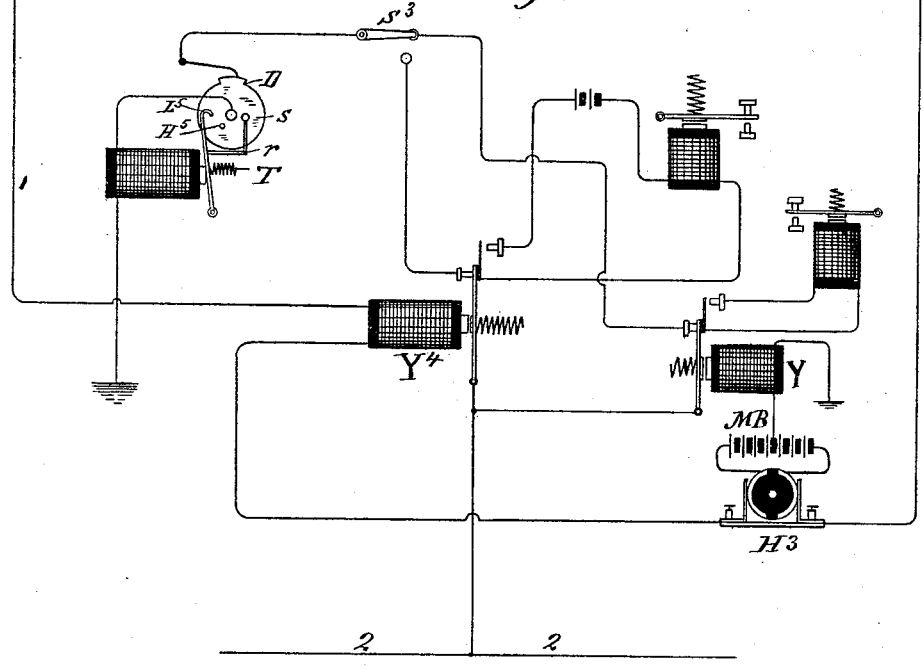
WITNESSES:
Gabriel J. W. Galster.
Wm. H. Capel.
INVENTOR,
J. H. Guest,
BY
Townsend & MacArthur
ATTORNEY.

UNITED STATES PATENT OFFICE.

JOHN H. GUEST, OF BROOKLYN, NEW YORK.

FIRE-TELEGRAPH.

SPECIFICATION forming part of Letters Patent No. 388,357, dated August 21, 1888.

Application filed May 25, 1887. Serial No. 239,288. (No model.)

*To all whom it may concern:*

Be it known that I, JOHN H. GUEST, a citizen of the United States, and a resident of Brooklyn, in the county of Kings and State of New York, have invented a certain new and useful Fire-Telegraph, of which the following is a specification.

My invention relates to those systems in which an all-round or complete metallic circuit is employed and the transmitting and receiving instruments are connected into ground branches from said metallic circuit.

The object of my invention is to provide a means whereby in case of an accidental or other abnormal grounding of the metallic circuit the transmitters shall not be rendered inoperative; and to this end my invention consists in providing a switch whereby in case of the derangement specified the transmitters may be switched from their grounds and connected into the metallic circuit, so that (the receiver for said transmitter having been also transferred from its ground branch to the metallic circuit) there shall be no interruption to the operativeness of the system.

The object of my invention is, further, to provide a simplified arrangement of circuits and apparatus whereby the same general metallic circuit may be used for the transmission of two classes of signals without interference; and to this end my invention consists in the combination, with the same metallic circuit, of transmitting and receiving apparatus for one class of signals included in the direct circuit with a suitable battery and a ground-connection from an intermediate portion of said battery, including the receiving-instrument for another class of signals, which are transmitted by instruments that make and break ground-connections taken from the metallic circuit at any desired points. In this system no battery is used in the ground-connection containing the receiving-instrument, but the signals transmitted from the grounded transmitters are received on such instrument through the operation of a portion of the electric current from the battery which is on the metallic circuit.

My invention is designed more particularly for application to that system in which the all-round metallic circuit contains ordinary district-messenger call-boxes or other transmitting devices placed in the closed metallic circuit, and in which one or more ground branches are employed containing automatic or other transmitters indicating the location of fire or attempt at burglary, or giving other intelligence, in combination with a ground at the central office containing a receiving-instrument for such automatic transmitters.

In accomplishing the ends of my invention I prefer to construct the automatic or other transmitting wheel or other device so that when in normal position or at rest the circuit through it shall be closed, and combine with such wheel a supplemental wheel or circuit-closing device that keeps the ground branch normally open, but which, when the wheel is released, closes such branch and keeps it closed, excepting at intervals when the transmitting-wheel breaks the branch in transmitting its signal. From the point of the circuit between the transmitting-wheel and the point of the branch where the branch is normally broken connection is made to the switch that, when closed, includes the wheel in the metallic circuit and when open breaks said connection, leaving the apparatus in condition to work in the normally-open ground branch. I prefer to control the operation of the switch that determines whether the automatic transmitter shall be in the ground branch or in the metallic circuit by an electro-magnet which is controlled from the central office, as will be hereinafter described.

I have herein illustrated my invention as applied to a system in which the fire-alarm signals transmitted by the automatic transmitter are automatically relayed onto another circuit, suitable provision being made to prevent the relaying of other signals than the fire-alarm signals coming over the metallic circuit either from instruments in the circuit or from other instruments in a ground-connection. Such a system is described in my prior application for patent, No. 234,754, filed April 14, 1887.

Figure 2:
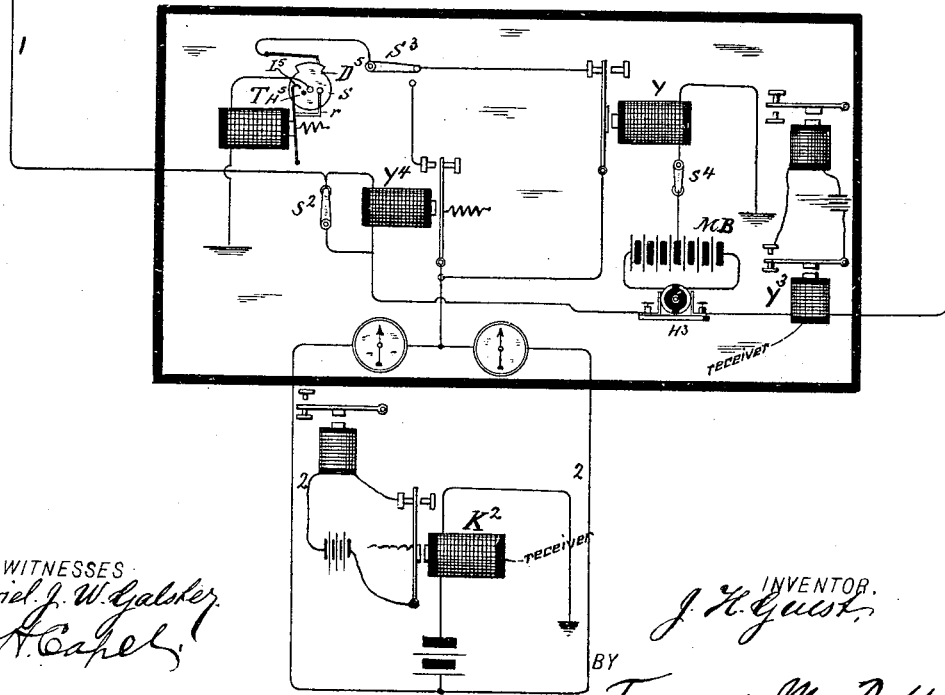

In the accompanying drawings, Figure 1 is a diagram of circuits and apparatus embodying my invention. Fig. 2 illustrates a detail of construction of the switches. Fig. 3 is a diagram illustrating a preferred form of my invention. Fig. 4 is a diagram illustrating the condition of the apparatus, Fig. 3, when the metallic circuit is grounded. Fig. 5 is a diagram illustrating a modification of my invention. Fig. 6 shows the transmitting-wheels in plan as arranged on the same shaft. Fig. 7 illustrates a modification in the arrangement of the receiving apparatus at the central station.

Referring to Fig. 1, the all-round closed metallic circuit (indicated by the numeral 1) includes one or more district-telegraph boxes, M, or other apparatus working on said closed metallic circuit and transmitting signals to be received on an instrument or apparatus, $Y^3$, of any suitable character included in a circuit with the main battery M B. In a ground branch from an intermediate portion of said battery is included a receiving-instrument, Y, which receives the signals sent from transmitting-wheels G $G^2$, that are released automatically by any desired means on the occurrence of fire, or are operated by hand or otherwise. The instruments G $G^2$ are in a ground branch at another point, as indicated, and are combined with a switch, $f$, that is in turn governed by an electro-magnet, $V^3$, and serves to control the connection between said wheels and the metallic circuit, so that one or the other shall send its signal when both are released, according to the condition of the magnet $V^3$. Wheel $G^2$ is the fire-alarm or other wheel, while the wheel $G^2$ is employed for sending a signal indicating some derangement of the local apparatus. In the ground branch is also included a wheel, $G^3$, which normally keeps said branch open, the wheels G $G^2$ being arranged, as shown, so that they would normally keep the branch closed if connection were made from them directly to ground.

In the drawings the wheels $G^3$ G $G^2$ are shown as combined with apparatus such as heretofore invented by me, whereby they may be released automatically.

Circuit-controllers of any suitable character adapted to be released automatically by fire or otherwise are indicated at D D, and are provided with two sets of contacts—one normally closed and the other normally open. The normally-closed contacts are in a circuit including a battery, L B, and one coil of a differential electro-magnet, $V^2$. Such circuit is indicated by the letter $a$. A normally-open thermostat-circuit (indicated by the letter $b$) includes the coils of electro-magnet $V^3$ and the second coil of the differential electro-magnet $V^2$. The latter circuit (indicated by the letter $b$) is a branch of the first-named circuit.

The electro-magnet V is provided with an armature having a catch that normally holds the wheels from rotation, and is included in the circuit indicated by the letter $c$, which circuit is formed in part through the wire $b$, so that on interruption of said wire by accident or otherwise the magnet V will lose its power. The circuit $c$ also passes through the front contact of the armature-lever for magnet $V^2$, so that the magnet V will also lose its power if the armature-lever of $V^2$ is drawn back. The magnet V is normally energized by current from a battery, L $B^2$. The armature-lever of magnet $V^2$ also carries an insulated contact adapted to make connection with a back contact-stop, as shown, so that when said lever falls back a shunt-circuit will be closed around the coil of said relay included in the circuit $a$. The initial contact on the wheel $G^2$ is longer than that on the wheel G, as shown. The purpose of this will be presently described. Normally the armature-lever of magnet $V^2$ is held up by the current circulating in wire $a$ and through the thermostat D. If said circuit be broken, the magnet $V^2$ will lose its power and its armature, dropping back, will break the circuit of magnet V, thus releasing the wheels $G^3$ G $G^2$. When the circuit-controller or thermostat moves over to a normally-open contact, it closes the circuit or branch $b$, thus energizing magnet $V^3$ and causing the latter to throw into the ground branch the wheel $G^2$. If the magnet V should lose its power through breakage only of the wire $c$ or wire $b$, the wheels will be released without any attendant action of magnet $V^3$, and the armature-lever of the latter will therefore remain against its back contact, so that the signal will be sent by the wheel G. If wires $a$ $b$ should become crossed or circuit be made for battery L B through both the normally-closed and normally-open circuits together, magnet $V^2$ will lose its power, thus releasing the wheels, as before explained; but through the short circuit formed by the insulated back contact of the magnet $V^2$ the current will be prevented from flowing in the magnet $V^3$, so that the latter's armature will be retained against its back contact, and the signal from wheel G will therefore be sent in. The artificial resistance $R^2$ is employed as a balance for the resistance of the coil $V^3$.

S indicates a switch of any suitable character that in one position—as, for instance, that shown—preserves the complete metallic circuit 1 1 independently of the instruments G $G^2$. When, however, it is turned to the other position away from contact 5 and to contact 6, it includes said instruments in the metallic circuit in obvious manner through the connection made from the ground branch to the point of the switch, such connection being taken from a point in the ground branch between the transmitting-wheels and the open-circuit wheel $G^3$.

In the ground branch or circuit is also included a switch for permanently opening said ground when the transmitting apparatus is included in the metallic circuit. This switch may be conveniently made a part of the switch-lever S, as indicated. A form of switch adapted for the purpose consists of the two contact-studs 7 7, included in the ground branch and normally, or when the switch is on the contact 5, bridged by a connecting-spring carried by the switch-lever S, as shown, but insulated from the metallic circuit. When the switch is turned to contact with stud 6, the ground-connection is broken between the studs 7 7, and no grounding of the metallic circuit can then be produced when the wheel $G^3$ rotates. The purpose of this arrangement will be described farther on.

The relay Y controls in obvious manner a ground-connection from a second circuit, 2, which is the circuit of a fire-alarm telegraph or of a fire-patrol, and has at $K^2$, in a ground-connection, an instrument for receiving the signals relayed from relay Y. In the ground-connection with the points of relay Y is also included a circuit closing and breaking wheel, $D^5$, and an electro-magnet, T, combined with suitable devices whereby when the instrument G sends in a signal the relay Y shall be prevented from relaying such signal to the circuit 2. The wheel $D^5$, having any suitable motive device, is normally detained by the arm $r$ engaging with a pin, S, on said wheel and normally held in position for engagement by the force of the electro-magnet T, by whose armature the arm is sustained. While the armature is attracted, a hook, $L^5$, on the same is out of the path of engagement of the stud $H^5$, carried by wheel $D^5$. If in the position of the parts shown the electro-magnet Y be excited, the magnet T loses its power and the wheel $D^5$ is released through the falling away of the armature for magnet T. In the retracted position of the armature-lever the hook $H^5$ is in position to be engaged by the pin $L^5$, and if the armature remain attracted long enough the hook and pin will engage, and no further movement of the armature or the wheel $D^5$ can take place until they are released from one another. If, however, the armature be immediately drawn up again and retained for a proper length of time, the wheel $D^5$ may continue to revolve until the pin $H^5$ passes the hook, after which any further movements of the armature-lever will not interfere with the continued movement of the wheel. The length of the initial contacts on wheels G $G^2$ are adjusted with relation to this action. Wheel G keeps the circuit closed for a sufficient time only to effect a release of the wheel $D^5$, but breaks the circuit immediately again, so that the relay Y, falling back, may cause the magnet T to draw up its armature and keep the same drawn up until the pin $H^5$ passes the hook $L^5$. The wheel $D^5$, therefore, continues to revolve until it breaks the circuit controlled by relay Y, and the signal sent by wheel G will therefore not be relayed while the wheel $D^5$ is revolving. The wheel $G^2$, after starting, keeps the circuit closed for a sufficient time to allow the pin $H^5$ to engage with the hook $L^5$, and further movement of the wheel $D^5$ is prevented, so that it shall not by its continued movement interrupt the circuit passing through the contacts of relay Y. The distance to which the wheel $D^5$ may revolve without breaking the circuit is limited, as will be seen, but is so adjusted that the circuit-breaking point will not have been reached when the hook and pin have engaged; but if the pin passes by the hook, as just explained, the circuit will be broken. These devices form no part of my present invention, and need not be more particularly herein described. They are described in a prior application for patent filed by me April 14, 1887, No. Serial 234,754.

At $Y^4$ is indicated a second relay electro-magnet at the central station, that is normally shunted or cut out of the metallic circuit by a switch, $S^2$. The relay $Y^4$ controls a ground-connection from 2, and which, like that controlled by Y, includes the devices $D^5$ and T, but which ground-connection is normally open at the points of a switch, $S^3$. On its normally-closed contact the switch $S^3$ keeps the ground-connection from the points of relay Y closed; but when said switch is turned it breaks the ground for the points of relay $Y^4$. Another switch, $S^4$, may be employed for breaking the ground-connection including relay Y.

The instrument Y is merely typical of any suitable receiving-instrument for the signals transmitted from the distant ground branch. Such instrument may be the ordinary Morse register or the controlling relay or magnet for such Morse register, as is well understood in the art, so that the operation of the magnet will allow the register to begin to move. In such case it is apparent that the continued operation of the magnet will permit the register to run down, and by this means notice of the permanent grounding of the metallic circuit 1 will be given.

In the position of the parts shown the relay $Y^4$ is out of circuit and the switch $S^3$ is turned so as to include the ground from circuit 1, leading through the normally-closed back contact of relay Y and the wheel $D^5$ and magnet T.

In the position of the parts shown the wheels G $G^2$ are in the ground branch or connection and the switch S closes the metallic circuit 1 independently of the wheels G $G^2$. Signals sent from the wheels G $G^2$ are received on the instrument Y or on the Morse register in obvious manner, the apparatus used with said wheels G $G^2$ being properly organized to close by means of wheel $G^3$ the ground branch when a signal is to transmitted, for which purpose the several wheels may be mounted on the same weight or spring driven shaft governed by a starting or controlling magnet, V. The signals from the wheel $G^2$ are relayed to the circuit 2 by the operation of the relay Y; but those from wheel G are not relayed, because the wheel $D^5$ is allowed to rotate continuously, and thus keep the ground branch broken during the reception of the signal by relay Y.

The signals transmitted by the instruments M are received on the instrument $Y^3$, consisting of a Morse register or other suitable apparatus, in ordinary way. If, now, at any time the circuit 1 should become grounded at any point other than through wheel $G^3$, it is obvious that the instruments G $G^2$ could not transmit any signal by making and breaking the ground-connection. Evidence of such grounding is obviously indicated immediately by the instrument Y, which may for that purpose be constructed or combined with any suitable apparatus, as is well understood in the art. If such instrument be a Morse register for receiving signals from instruments in the ground branches, the running down of the instrument would be evidence of the grounding. When such notice is given, the switch $S^4$ is turned to break the ground including Y and the switches $S^2$ $S^3$ are turned to include instrument $Y^4$ in the metallic circuit and to break the connection from the point of relay Y, and at the same time to make the ground-connection from the thereafter normally-closed front contact-stop of relay $Y^4$.

The relay $Y^4$ is here shown as a separate relay independent of relay or receiving-instrument $Y^3$; but it is obvious that the relay $Y^4$ might be used for the double purpose of receiving the signals sent by instruments M and by wheels or instruments G $G^2$ when the latter are included in the metallic circuit. In such case the switch $S^2$ would be dispensed with and the contacts of the relay, besides being adapted to govern the branch on the circuit 2, would also govern the local register-circuit in the same way as any relay-magnet included in a normally-closed local circuit. Such a modification is illustrated in Fig. 7, and will be readily understood without further detailed description.

The switch S is also turned by some person sent from the central office or notified to do so, thus including the wheels G $G^2$ in the metallic circuit 1 1, said metallic circuit being completed normally through the wheel G, which, as will be seen, is properly constructed to close contact when in position of rest. The turning of the switch S also breaks the ground-connection of the wheels G $G^2$ permanently, so that when such wheels operate for the purpose of transmitting a signal over the complete metallic circuit they may not be shunted over a circuit formed from one side of the metallic circuit 1 through switch S, contact 6, wheel $G^3$, and ground to the accidental or permanent ground, in case said ground be formed on the other side or branch of the metallic circuit, and thus back to the other pole of the battery. If, now, the wheel G or $G^2$ should send a signal, such signal would be transmitted by breaks and makes of the metallic circuit 1 and would be received on the instrument $Y^4$, which is now in said circuit, or on any other suitable instrument, the transmitters and receivers being now in the closed metallic circuit. The signals sent by wheels G $G^2$ would be transmitted and received in obvious manner and the same control of a ground branch including the device $D^5$ T would be had by relay $Y^4$ as is had by relay Y, since the contact-stop of relay $Y^4$ is the front contact-stop, or that on which the armature-lever normally rests, owing to the continued excitation of the magnet $Y^4$, which is now in a normally-closed circuit, instead of being in a normally-open circuit, like magnet Y.

It will be obvious that in order to permit the relay $Y^4$ to act upon the devices $D^5$ T in the same manner as relay Y the length of the initial breaks of circuit produced by wheels G $G^2$ when the same are included in the normally-closed circuit 1 must be substantially the same as the length of the initial closures of circuit produced by said wheels when they are operated over the ground branch.

When the accidental or other disturbing ground-connection of circuit 1 is removed, the switch S may be turned back to its normal position. In the meantime, however, the signals from the wheels G $G^2$ may come in over the circuit 1 without interruption.

The danger of interference from the instruments M when the wheels G $G^2$ are included in the metallic circuit is in a great degree removed by suitably constructing the wheels G $G^2$, or the apparatus by which they are operated, to repeat their signals a large number of times.

It will be understood that the object of arranging the instruments M in a closed metallic circuit and the instruments G $G^2$ in the grounds is to keep the two devices electrically independent of one another as far as possible; but as the permanent grounding of the metallic circuit would render the instruments G $G^2$ inoperative I by my invention include them temporarily in the circuit with the instruments M, thus keeping them for the time being, or until the defect is removed, in condition to still transmit a signal to the central office. When the accidental ground is removed, the normal condition of the circuits may be restored.

In the arrangement shown in Fig. 1 it is necessary that the desired transfer of the instruments G $G^2$ should be effected by manual operation of the switches S. In the arrangement shown in Fig. 3 the desired transfer is effected simultaneously at all points by the operation of electro-magnets controlled at the central office, as will be now described. In this case I prefer to employ an electro magnet, $B^2$, which is included in the metallic circuit, as indicated, and operates upon a switch similar to the switch S. I prefer to employ for this purpose an electro magnet suitably constructed to be operated by reversals of electric current over the circuit 1. An electro-magnet suitable for this purpose is indicated at $B^2$, and its armature carries the switch-lever. A reversal of position of said armature-lever is produced by simply turning a pole-changing switch of any desired construction (indicated at $H^3$) at the central office, the terminals of said switch being connected to the line and to the battery M B in obvious manner, so that the battery may be reversed on the line at pleasure.

The switch-lever controlled by the polarized instrument $B^2$ is indicated at S, and the metallic circuit when intact and when the wheels G $G^2$ are to send their signals over the ground is carried through the receiving-instrument and is completed across two switch-springs, $m$ $m$, which normally rest on a metallic conducting-plate, $p$, carried by an insulating-block connected to the lever. When, however, by a reversal of current on the main line the switch-lever S is thrown to the position indicated in Fig. 4, the line-circuit between the springs is broken, but is then completed from the upper of the two springs to the contact for the switch-lever S, and through said lever to the transmitting-wheels G G², just as in the case of lever S, Fig. 1, a circuit is completed through stud 6. In the normal position of the switch, however, the connection just described is obviously broken and the ground-connection for the instruments G G² is completed through the two contacts of the switch-lever S and the lever itself in obvious manner. This ground-connection is broken, however, when the lever is thrown to the position shown in Fig. 4, the effect upon such ground-connection being the same as is produced by the operation of the switch S, Fig. 1.

The parts are supposed to be normally in the position shown in Fig. 3, and the polarity of the current from battery M B is such as to hold the lever in the position indicated. Should the line become grounded, notice is given at the central office, as before explained. In order that said ground-connection may not render any of the wheels G G² inoperative, the pole-changer H³ is simply operated, thus reversing all the switch-levers S on the circuit and shifting the instruments G G² into the metallic circuit, as before explained, so that with the single permanent ground indicated in Fig. 4 the wheels G G² may send their signals to the central office over the circuit 1, in the same way as the instruments M, and without disturbance from the presence of the ground-connection at X.

It is obvious that any form of polarized receiving-instrument will answer the purposes of my invention, and I have therefore omitted to represent the details of the same.

In the modification of my invention indicated in Fig. 5 I have shown an additional battery, G B, connected to the metallic circuit for the purpose of operating the relay Y. In such case there might be conditions under which the battery G B would act to reverse the switch-lever S after the same had been turned to include the instruments G G³ in the metallic circuit, and in order to prevent such result I have resorted to an additional switch device which in each case shall, when the switch-lever is turned on the occurrence of a permanent ground, break the circuit through the polarized magnets. Such a switch may be made of a spring, $r$, against which the end of the lever S shall bear, so as to remove the spring from contact with a contact-stop, $t$, when the lever is turned to the position indicated by the dotted lines. In order to restore said switch to the normal position, it is necessary to complete the metallic circuit through the same and then reverse the battery M B. To temporarily complete the metallic circuit for this purpose, I make use of a second switch controlled by an electro-magnet, A⁵, whose coils are constantly in the main-line circuit. The switch controlled by said magnet consists of the armature-lever for the magnet and a suitable contact-stop for the same, as indicated, properly arranged to complete the metallic circuit through the magnet B² when the magnet A⁵ is sufficiently energized, but normally held out of contact by means of a retracting-spring adjusted to such a strength that the current from main battery M B alone cannot draw up the armature-lever. The additional battery-power required to operate the armature of magnet A⁵ is obtained from a battery, M B², which may be introduced into circuit with battery M B by means of a key, K⁴.

In the position of the switch S shown the metallic circuit is completed through the magnet B² and the switch $t\ r$, and the ground-connection from the instruments G G² is completed through the contacts of lever S in obvious manner. When the lever is thrown to the position indicated by dotted lines for the purpose of breaking the ground-connection and completing the metallic circuit through the wheels G G², the switch-points $t\ r$ are open.

In the connection to the wheels G G² is an artificial resistance, R², which is preferably made approximately equal to the resistance of the coils for magnet B².

When it is desired to restore a switch to original position, the key K⁴ is operated, thus operating the armature of magnet A⁵ and closing the branch including the coils of magnet B². The current-reverser H³ is now operated and the magnet B² is acted upon, so as to throw the switch S over to the position shown, after which the key K⁴ is allowed to return to its normal position, thus cutting out the section of battery M B² and permitting the armature of magnet A⁵ to be retracted. The points $t\ r$ are now in contact and the magnet B² is in the metallic circuit ready for the operation of changing the switch on the occurrence of the ground.

Other arrangements of magnet and other ways of controlling the same from the central office will answer the purpose of my invention, and I do not limit myself in this respect, as the invention consists, essentially, in the provision of any suitably-controlled electro-magnet operating upon a switch for shifting the wheels G G² from the ground circuit or connection to the metallic circuit or connection, such magnet being controlled from the central office by means of a suitable circuit controller or changer.

I have shown the switch-levers S² S³ S⁴ as independently operated; but it is obvious that they might be operated together by means of a suitable connecting arm or handle, as indicated in Fig. 2.

By the arrangement shown in Fig. 3 I not only avoid the necessity of a manual operation of the switch S in case of an accidental ground, but also remove the objection that, with the arrangement in Fig. 1, there is necessarily an interval of time between the occurrence of the accidental ground and the setting of the switch S to include the instruments in the metallic circuit. By the advice shown in Fig. 3 this difficulty is avoided, and there is no time at which the instruments G G² are not in condition to transmit their signals either over their ground-circuit, or, in case of accidental ground, over the metallic circuit.

What I claim as my invention is—

1. The combination, with a circuit, 1, of transmitting and receiving instruments in ground branches or connections from the same and a switch for transferring the transmitting-instrument from a ground wire or connection into the circuit 1, or vice versa, as and for the purpose described.

2. The combination, with a circuit, 1, containing transmitting and receiving apparatus for one class of signals, of ground connections including transmitters for another class of signals, switches for transferring such grounded instruments to or from the circuit 1, and a switch for breaking the ground-connection containing the receiver.

3. The combination, with the metallic circuit 1, of transmitting-instruments in normally-open ground branches, a switch normally contained in and completing the circuit 1, and a normally-open contact for said switch connected to the said branch at a point between the transmitters and the break in the ground branch, as and for the purpose described.

4. The combination, with a normally-closed circuit, as described, having transmitters and receivers included in such normally-closed circuit, of a ground branch from said circuit normally open, a transmitter in said ground branch at a point between the break in the branch and the line, and a switch connected to line and having a contact-point joined to the ground branch at a point between the transmitter and the break, as and for the purpose described.

5. The combination, with the circuit 1, having grounds over which suitable transmitters operate to send signals to an instrument in the ground-connection on another point on said circuit, of a switch for transferring said transmitter to the circuit 1 and an electro-magnet controlled from a central office for operating said switch, as and for the purpose described.

6. The combination, with the circuit 1 and instruments G G² of any character, having ground-connections from said circuit, of a switch for changing said instruments into the circuit 1, a magnet controlling said switch responsive to reversals of current on the circuit, and apparatus at the central office for producing such reversals, as and for the purpose described.

7. The combination, with the complete metallic circuit 1, containing instruments M and Y³, of a battery, M B, normally charging said circuit, a pole-changer for reversing said battery on the circuit, an independent set of instruments working over grounds from said circuit, and an electro-magnetically-controlled switch for switching the transmitters working over the grounds into the metallic circuit.

Signed at New York, in the county of New York and State of New York, this 24th day of May, A. D. 1887.

JOHN H. GUEST.

Witnesses:
WM. H. CAPEL,
HUGO KOELKER.